US012099375B2

(12) United States Patent
Shvalb et al.

(10) Patent No.: US 12,099,375 B2
(45) Date of Patent: Sep. 24, 2024

(54) MULTIPLE TARGET INTERCEPTION

(71) Applicant: ARIEL SCIENTIFIC INNOVATIONS LTD., Ariel (IL)

(72) Inventors: Nir Shvalb, Kibutz Bahan (IL); Shlomi Hacohen, Migron Psagot (IL); Shraga Shoval, Moshav Ein Eron (IL)

(73) Assignee: ARIEL SCIENTIFIC INNOVATIONS LTD., Ariel (IL)

( * ) Notice: Subject to any disclaimer, the term of this patent is extended or adjusted under 35 U.S.C. 154(b) by 251 days.

(21) Appl. No.: 17/442,230

(22) PCT Filed: Mar. 27, 2020

(86) PCT No.: PCT/IL2020/050372
§ 371 (c)(1),
(2) Date: Sep. 23, 2021

(87) PCT Pub. No.: WO2020/194314
PCT Pub. Date: Oct. 1, 2020

(65) Prior Publication Data
US 2022/0155802 A1    May 19, 2022

(30) Foreign Application Priority Data

Mar. 28, 2019 (IL) .......................................... 265713

(51) Int. Cl.
G05D 1/00    (2024.01)
(52) U.S. Cl.
CPC ............... G05D 1/12 (2013.01); G05D 1/104 (2013.01); G05D 1/1064 (2019.05)
(58) Field of Classification Search
CPC ........ G05D 1/12; G05D 1/104; G05D 1/1064; G08G 5/0026; G08G 5/0034; G08G 5/0069; G08G 5/045
(Continued)

(56) References Cited

U.S. PATENT DOCUMENTS 6,279,851 B1 *  8/2001  Huss .......................... F41G 7/22
                                                              342/63
7,338,009 B1 *  3/2008  Bobinchak ............ F41G 7/2253
                                                              244/3.1
(Continued)

FOREIGN PATENT DOCUMENTS

CN    102915465 B    1/2015

OTHER PUBLICATIONS

Hacohen, S. (Dec. 2017). Robot Motion Planning in Dynamic Uncertain Environments. Ariel University.
(Continued)

Primary Examiner — Isaac G Smith
(74) Attorney, Agent, or Firm — The Roy Gross Law Firm, LLC; Roy Gross

(57) ABSTRACT

A method comprising: operating a swarm of autonomous vehicles to maximize a number of intercepted targets, wherein, for each of said autonomous vehicles, the method comprises: identifying a plurality of objects in an operational area as targets or obstacles; determining a location parameter for each of said plurality of objects; calculating a trajectory of motion for said autonomous vehicle based at least in part on said location parameters of each of said plurality of objects, wherein said calculating maximizes: (i) a probability of intercepting each of said targets, and (ii) a probability of avoiding collisions with each of said obstacles; and moving said autonomous vehicle along said trajectory of motion.

18 Claims, 8 Drawing Sheets

(58) Field of Classification Search
USPC .......................................................... 701/3
See application file for complete search history.

(56) References Cited

U.S. PATENT DOCUMENTS

| | | |
|---|---|---|
| 2011/0224903 A1 | 9/2011 | Romero et al. |
| 2019/0051198 A1 | 2/2019 | Nimmagadda et al. |
| 2019/0262992 A1* | 8/2019 | Kim ........................ G06V 20/58 |

OTHER PUBLICATIONS

Hacohen, S., Shoval, S., & Shvalb, N. (Jul. 2017). Multi agents' multi targets mission under uncertainty using probability navigation function. In 2017 13th IEEE International Conference on Control & Automation (ICCA) (pp. 845-850). IEEE.

Hacohen, S., Shoval, S. & Shvalb, N. Probability Navigation Function for Stochastic Static Environments. Int. J. Control Autom. Syst. 17, 2097-2113 (2019). https://doi.org/10.1007/s12555-018-0563-2.

Noreils, Fabrice. (1993). Toward a Robot Architecture Integrating Cooperation between Mobile Robots: Application to Indoor Environment. International Journal of Robotic Research—IJRR. 12. 79-98. 10.1177/027836499301200106.

P. Caloud, Wonyun Choi, J. .-C. Latombe, C. Le Pape and M. Yim, "Indoor automation with many mobile robots," EEE International Workshop on Intelligent Robots and Systems, Towards a New Frontier of Applications, 1990, pp. 67-72 vol. 1, doi: 10.1109/IROS. 1990.262370.

H. Asama, A. Matsumoto and Y. Ishida, "Design of an Autonomous and Distributed Robot System: Actress," Proceedings. IEEE/RSJ International Workshop on Intelligent Robots and Systems. (IROS '89) The Autonomous Mobile Robots and Its Applications, 1989, pp. 283-290, doi: 10.1109/IROS.1989.637920.

Kumar, Manish & Cohen, Kelly & Homchaudhuri, Baisravan. (2011). Cooperative Control of Multiple Uninhabited Aerial Vehicles for Monitoring and Fighting Wildfires. Journal of Aerospace Computing, Information and Communication. 8. 1-16. 10.2514/1.48403.

W. Burgard, M. Moors, C. Stachniss and F. E. Schneider, "Coordinated multi-robot exploration," in IEEE Transactions on Robotics, vol. 21, No. 3, pp. 376-386, Jun. 2005, doi: 10.1109/TRO.2004. 839232.

D. V. Dimarogonas and K. J. Kyriakopoulos, "Connectedness Preserving Distributed Swarm Aggregation for Multiple Kinematic Robots," in IEEE Transactions on Robotics, vol. 24, No. 5, pp. 1213-1223, Oct. 2008, doi: 10.1109/TRO.2008.2002313.

Y. Diaz-Mercado and M. Egerstedt, "Multirobot Mixing via Braid Groups," in IEEE Transactions on Robotics, vol. 33, No. 6, pp. 1375-1385, Dec. 2017, doi: 10.1109/TRO.2017.2737636.

S. Hacohen, S. Shoval and N. Shvalb, "Motion planning in dynamic uncertain environment using probability navigation function," 2014 IEEE 28th Convention of Electrical & Electronics Engineers in Israel (IEEEI), 2014, pp. 1-5, doi: 10.1109/EEEI.2014.7005766.

Morrison, C., Sitnikova, E., & Shoval, S. (2018). A Review of the Relationship Between Cyber-Physical Systems, Autonomous Vehicles and Their Trustworthiness. In International Conference on Cyber Warfare and Security (p. 611-XV). Academic Conferences International Limited.

Hacohen Shlomi, Shraga Shoval and Nir Shvalb, "Applying Probability Navigation Function in Dynamic Uncertain Environments", Robotics and Autonomous Systems, vol. 87, Jan. 2017, pp. 237-246. doi: 10.1016/j.robot.2016.10.010.

Hacohen, S., Shvalb, N., & Shoval, S. (2018). Dynamic model for pedestrian crossing in congested traffic based on probabilistic navigation function. Transportation Research Part C: Emerging Technologies, 86, 78-96. doi:10.1016/j.trc.2017.10.024.

Reimann, J., & Vachtsevanos, G. (2006). UAVs in Urban Operations: Target Interception and Containment. Journal of Intelligent and Robotic Systems, 47(4), 383-396. doi: 10.1007/s10846-006-9089-6.

PCT International Preliminary Report on Patentability for International Application No. PCT/IL2020/050372 dated Sep. 28, 2021, 5 pp.

PCT Written Opinion for International Application No. PCT/IL2020/050372 mailed Jul. 22, 2020, 4 pp.

PCT Search Report for International Application No. PCT/IL2020/050372 mailed Jul. 22, 2020, 4 pp.

* cited by examiner

MULTIPLE TARGET INTERCEPTION

CROSS-REFERENCE TO RELATED APPLICATIONS

This application is a National Phase of PCT Patent Application No. PCT/IL2020/050372 having International filing date of Mar. 27, 2020, which claims the benefit of Israel Patent Application No. 265713, filed Mar. 28, 2019, the contents of which are all incorporated herein by reference in their entirety.

BACKGROUND

The invention relates to the field of multiple target interception, and specifically, to controlling multiple mobile agents to intercept multiple targets.

Some missions may require capabilities that are beyond the scope of a single agent. Time and process constraints may also enforce the use of multiple cooperative autonomous agents working, e.g., simultaneously, as a swarm. In cooperative teams, individual members that appear to be independent, may work together to create a complex performance, e.g., where the whole is greater than the sum of its parts.

The autonomous mobile agents may be required to intercept a set of targets, e.g., static or dynamic targets, while avoiding collisions with dynamic obstacles.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an aspect of the present invention, a method for operating a swarm of autonomous vehicles to maximize a number of intercepted targets, wherein, for each autonomous vehicle, the method includes: identifying a plurality of objects in an operational area as targets or obstacles; determining a location parameter for each of the plurality of objects; calculating a trajectory of motion for the autonomous vehicle based at least in part on said location parameters of each of the plurality of objects, wherein the calculating maximizes: (i) a probability of intercepting each of the targets, and (ii) a probability of avoiding collisions with each of the obstacles; and moving the autonomous vehicle along the trajectory of motion.

There is also provided, in accordance with another aspect of the present invention, a swarm of autonomous vehicles, each comprising at least one hardware processor; and a non-transitory computer-readable storage medium having stored thereon program instructions, the program instructions executable by the at least one hardware processor to operate an autonomous vehicle to: identify a plurality of objects in an operational area as targets or obstacles; determine a location parameter for each of the plurality of objects; calculate a trajectory of motion for the autonomous vehicle based at least in part on said location parameters of each of the plurality of objects, wherein the calculating maximizes (i) a probability of intercepting each of the targets, and (ii) a probability of avoiding collisions with each of the obstacles; and move the autonomous vehicle along the trajectory of motion.

There is also provided, in accordance with another aspect of the present invention, a computer program product comprising a non-transitory computer-readable storage medium having program instructions embodied therewith, the program instructions executable by at least one hardware processor to operate an autonomous vehicle of a swarm of autonomous vehicles to: identify a plurality of objects in an operational area as targets or obstacles; determine a location parameter for each of the plurality of objects; calculate a trajectory of motion for the autonomous vehicle based at least in part on said location parameters of each of the plurality of objects, wherein the calculating maximizes (i) a probability of intercepting each of the targets, and (ii) a probability of avoiding collisions with each of the obstacles; and move the autonomous vehicle along the trajectory of motion.

In some embodiments, said identifying comprises determining a distance between said autonomous vehicle and at least some of said plurality of objects. In some embodiments, said calculating is based, at least in part, on said determined distances.

In some embodiments, the operating includes repeating iteratively the identifying, determining, calculating, and moving, until all the target are intercepted.

In some embodiments, said location parameter of an object indicates a probable location of said object.

In some embodiments, said probable location of said object is expressed as a Probability Density Function (PDF).

In some embodiments, the location parameter of an object includes a geographical location of the object.

In some embodiments, at least some of the identifying and the determining includes receiving information from an external source selected from the group consisting of: a sensing unit of the autonomous vehicle, another autonomous vehicle, and a control center.

In some embodiments, the calculating includes weighting the probability of intercepting and the probability of avoiding collisions based, at least in part, on a count of the plurality of objects.

In some embodiments, the weighting is user-adjustable.

In some embodiments, the obstacles include at least one other autonomous vehicle of the swarm of autonomous vehicles.

In some embodiments, with respect to a target, the intercepting includes at least one of: achieving physical proximity to the target, destroying the target, monitoring the target, and changing the target.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Described herein are computer methods, systems, and products for intercepting multiple targets. A problem of intercepting a set of targets, for example, by a swarm of mobile agents, may be solved by a simultaneous solution, e.g., an interception solution which may enable simultaneous target acquisition and/or motion planning, for example, without requiring decomposition of the problem. The interception solution may enable interception of a set of dynamic and/or static targets, while avoiding collision with multiple dynamic and/or static obstacles, which may include other mobile agents.

In some embodiments, the interception solution may utilize a deterministic scheme for a deterministic scenario, e.g., when locations are known, and/or a stochastic scheme for a stochastic scenario, e.g., when locations are not perfectly known.

The deterministic scheme may provide an analytical solution for multi-agent multi-target deterministic scenarios, for example, to guarantee interception of all static and/or dynamic targets, for example, while avoiding collision between different agents and/or between agents and obstacles. The deterministic scheme may exhibit and/or provide full convergence.

In some embodiments, the stochastic scheme may implement an analytical solution for multi-agent multi-target stochastic scenarios, for example, where all targets are intercepted while limiting the risk for collisions to a predefined value. The stochastic scheme may exhibit almost sure convergence.

The stochastic scheme may enable use of low cost sensors and/or systems, for example, with only a minor addition to an expected time for convergence in dynamic and/or real time environments.

In some embodiments, both stochastic and deterministic schemes may provide a simple-to-compute, and/or time efficient solution, for example, which may be suitable for an extended range of real time applications.

In some embodiments, a complexity of the interception solution, e.g., including the stochastic and/or deterministic schemes, may be lower than alternative solutions, for example, since it does not require separate task allocation of all targets and separate trajectory planning. The computational complexity of the interception solution may grow linearly with the number of agents, e.g., making it scalable, since for every additional agent only a single function is added. The convergence time may decrease with the number of agents and may be robust to uncertainties and/or to dynamics of targets.

Figure 1:
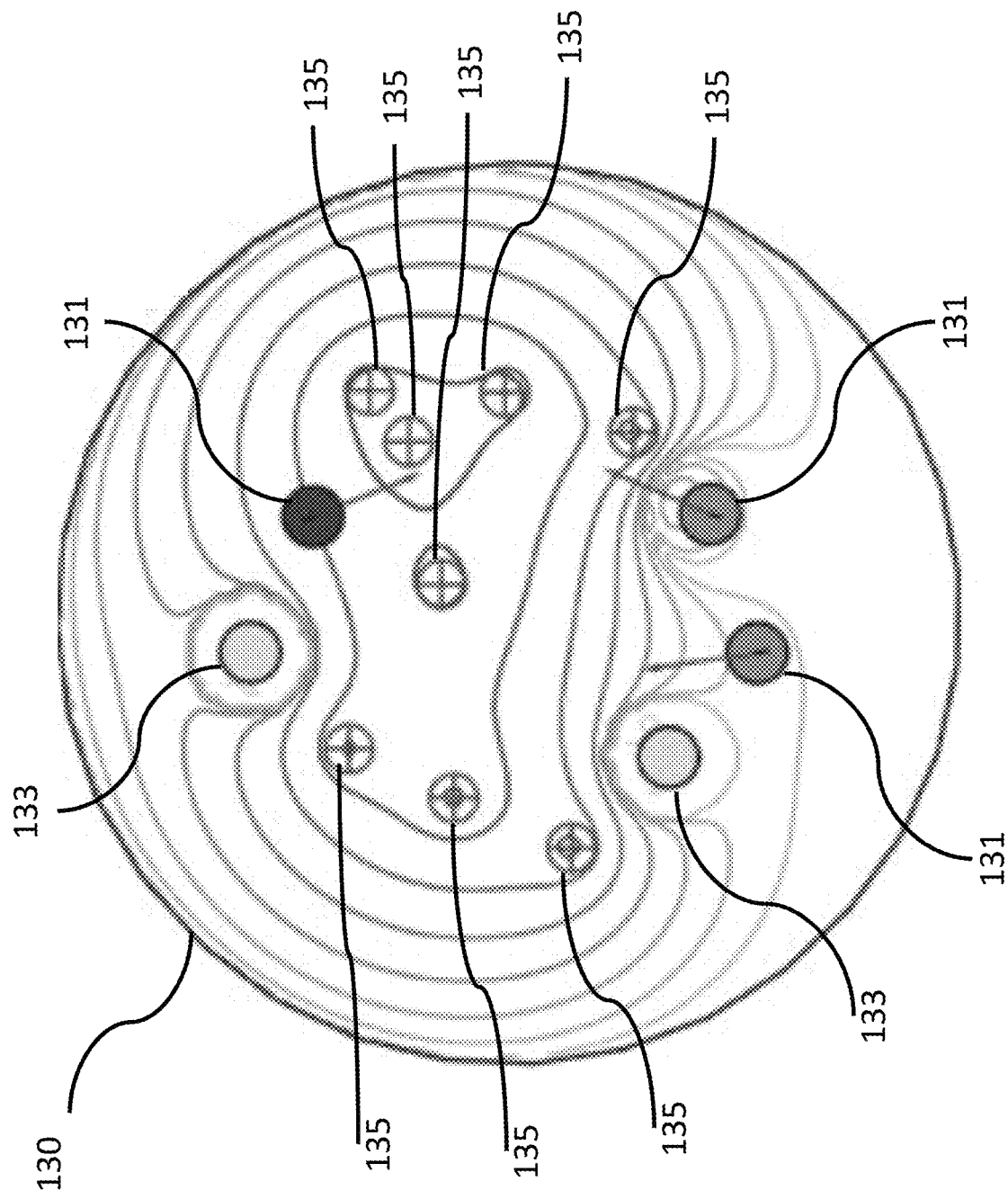
FIG. 1 shows a schematic illustration of an exemplary multiple agent multiple target interception scenario, according to an embodiment.

Reference is now made to FIG. 1, which is a schematic illustration of a multi agent multi target interception scenario, according to an embodiment of the current invention. The scenario may include an operational area 130 with a plurality of mobile agents 131, which may be configured to intercept a plurality of static and/or dynamic targets 135 in operational area 130, while avoiding one another and/or static and/or dynamic obstacles 133 in operational area 130, wherein each of agents 131 may identify other agents 131 as obstacles 133.

Figure 2:
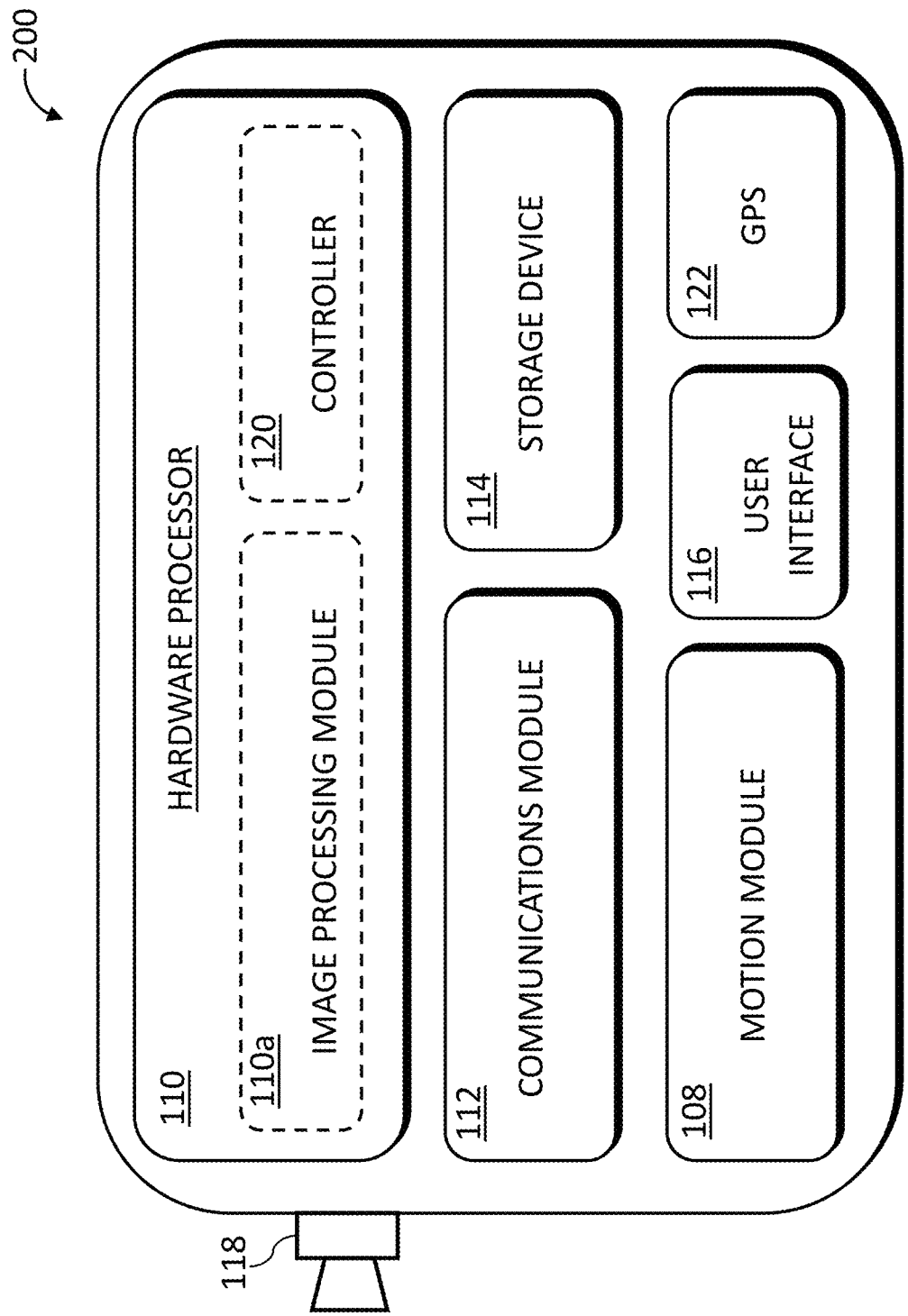
FIG. 2 shows a schematic illustration of an exemplary autonomous vehicle of a swarm for multiple target interception, according to an embodiment.

Reference is now made to FIG. 2, which is a schematic illustration of an exemplary autonomous vehicle 200 configured for intercepting targets. The various components of autonomous vehicle 200 may be implemented in hardware, software or a combination of both hardware and software. In various embodiments, autonomous vehicle 200 may include a mobile vehicle, a robot, a drone, an Unmanned Aerial Vehicle (UAV), and/or any component of a mobile vehicle, a robot, a drone, and/or a UAV. autonomous vehicle 200 as described herein is only an exemplary embodiment of the present invention, and in practice may have more or fewer components than shown, may combine two or more of the components, or a may have a different configuration or arrangement of the components.

In some embodiments, autonomous vehicle 200 may include a hardware processor 110, an image processing module 110a, a communications module 112, a memory storage device 114, a user interface 116, an imaging sensor 118, a controller 120, a Global Positioning System (GPS) module 122, and/or a motion module 108. Autonomous vehicle 200 may store in a non-volatile memory thereof, such as storage device 114, software instructions or components configured to operate a processing unit (also "hardware processor," "CPU," or simply "processor), such as hardware processor 110. In some embodiments, the software components may include an operating system, including various software components and/or drivers for controlling and managing general system tasks (e.g., memory management, storage device control, power management, etc.) and facilitating communication between various hardware and software components.

In some embodiments, non-transient computer-readable storage device 114 (which may include one or more computer readable storage mediums) is used for storing, retrieving, comparing, and/or annotating captured frames. Image frames may be stored on storage device 114 based on one or more attributes, or tags, such as a time stamp, a user-entered label, or the result of an applied image processing method indicating the association of the frames, to name a few.

In some embodiments, imaging sensor 118 may include one or more sensors, for example, which may input one or more data streams and/or multiple frames to enable identification of at least one object. In other embodiments, imaging sensor 118 may include an interface to an external imaging device, e.g., which is not part of autonomous vehicle 200.

The software instructions and/or components operating hardware processor 110 may include instructions for receiving and analyzing multiple frames captured by imaging sensor 118. For example, image processing module 110a may receive one or more images and/or image streams from imaging sensor 118 or from any other interior and/or external device, and apply one or more image processing algorithms thereto. In some embodiments, image processing module 110a includes one or more algorithms configured to perform object recognition and classification in images captured by imaging sensor 118 or by any other interior and/or external device, using any suitable image processing or feature extraction technique. The image streams received by the image processing module 110a may vary in resolution, frame rate, format, and protocol. The image stream processing module 110a may apply image stream processing algorithms alone or in combination.

For example, communications module 112 may connect autonomous vehicle 200 to a network, such as the Internet, a local area network, a wide area network and/or a wireless network. Communications module 112 facilitates communications with other external information sources and/or devices, e.g., other autonomous vehicles and/or external imaging devices, over one or more external ports, and includes various software components for handling data received by autonomous vehicle 200.

For example, user interface 116 may include circuitry and/or logic configured to interface between autonomous vehicle 200 and a user of autonomous vehicle 200. User interface 116 may be implemented by any wired and/or wireless link, e.g., using any suitable, Physical Layer (PHY) components and/or protocols.

For example, GPS module 122 may include a Global Navigation Satellite System, e.g., which may include a GPS, a GLObal NAvigation Satellite System (GLONASS), a Galileo satellite navigation system, and/or any other satellite navigation system configured to determine positioning information based on satellite signals. In some embodiments, GPS module 122 may include an interface to receive positioning information from a control unit and/or from any other external system.

For example, motion module 108 may provide access to a plurality of motion, navigation, and/or flight components enabling autonomous vehicle 200, and/or one or more components of autonomous vehicle 200, to navigate, fly, and/or move according to one or more directions and/or parameters.

In other embodiments, autonomous vehicle 200 may exclude motion module 108, image processing module 110*a*, imaging sensor 118, GPS module 122, and/or any other component and/or sensor.

In some embodiments, controller 120 may be configured to perform and/or to trigger, cause, control and/or instruct autonomous vehicle 200 to perform one or more functionalities, operations, procedures, and/or communications, to generate and/or communicate one or more messages and/or transmissions, and/or to control motion module 108, image processing module 110*a*, GPS module 122, and/or any other module and/or component of autonomous vehicle 200.

In some embodiments, a solution for operating a swarm of autonomous vehicles may be configured to maximize a number of intercepted targets while avoiding collisions with obstacles. The solution may be implemented in each autonomous vehicle, for example, separately, e.g., as described below.

In some embodiments, controller 120 may be configured to cause an autonomous vehicle of a swarm of autonomous vehicles, e.g., autonomous vehicle 200, to implement the solution, e.g., as described below.

In some embodiments, controller 120 may be configured to cause image processing module 110*a* to identify a plurality of objects, e.g., in an operational area, as targets and/or obstacles, e.g., as described below.

In some embodiments, controller 120 may be configured to determine a location parameter for each of the plurality of objects, e.g., as described below.

In some embodiments, controller 120 may be configured to calculate a trajectory of motion for the autonomous vehicle, for example, based on location parameters of each of the plurality of objects, e.g., as described below.

In some embodiments, controller 120 may be configured to calculate the trajectory of motion, for example, based on maximizing a probability of intercepting each of the targets, and/or maximizing a probability of avoiding collisions with each of the obstacles, e.g., as described below.

In some embodiments, controller 120 may be configured to calculate the trajectory of motion, for example, based at on determined distances between the autonomous vehicle and at least one, e.g., each, of the plurality of objects.

In some embodiments, controller 120 may be configured to calculate the trajectory of motion by weighting, e.g., in a user-adjustable form, the probability of intercepting and the probability of avoiding collisions, for example, based on a count of the plurality of objects.

In some embodiments, controller 120 may be configured to cause motion module 108 to move the autonomous vehicle along the trajectory of motion, e.g., as described below.

In some embodiments, controller 120 may be configured to repeat iteratively and/or continuously the identifying, determining, calculating, computing, and moving, for example, until all the target are intercepted, e.g., as described below.

In some embodiments, a location parameter of an object may indicate a probable location of the object, e.g., as described below.

In some embodiments, the probable location of the object may be expressed as a Probability Density Function (PDF), e.g., as described below.

In other embodiments, the probable location of the object may be expressed in any other way using any other function and/or algorithm.

In some embodiments, a location parameter of an object may include a geographical location of the object, e.g., as described below. In one example, the geographical location of the object may include a geographical coordinate and/or any other geographical information.

In some embodiments, controller 120 may be configured to cause communications module 112 to receive information from an external and/or internal source, e.g., with respect to autonomous vehicle 200, for example, which may be selected from at least one of a sensor of autonomous vehicle 200, e.g., imaging sensor 118, another autonomous vehicle, e.g., which may belong to the swarm including autonomous vehicle 200, a control center and/or device, e.g., external to autonomous vehicle 200, and/or from any other information source, e.g., as described below.

In some embodiments, controller 120 may be configured to cause image processing module 110*a* to identify the plurality of objects, e.g., as agents, targets, and/or obstacles, based on imaging information from a sensor system of autonomous vehicle 200, e.g., imaging sensor 118, and/or from another autonomous vehicle and/or control center, e.g., external to autonomous vehicle 200.

In some embodiments, the obstacles may include at least one other autonomous vehicle of the swarm of autonomous vehicles, e.g., as described below.

In some embodiments, intercepting a target may include achieving physical proximity to the target, destroying the target, monitoring the target, changing the target, and/or performing any other action and/or function with respect to the target, e.g., as described below.

In some embodiments, the problem of target assignment and/or motion planning for a multi agent swarm may be hard to solve, for example, since behavior of a cooperative team may be hard to predict as the number of interactions between the team members increases combinatorically, and each interaction may result in an unexpected behavior. Also, the interfaces between the agents may often be the most susceptible element in the mission. As a result, the performance of the team may be lower than the sum of its parts. Thus, the traditional assignment problem of agents to tasks may be considered to be a fundamental combinatorial optimization problem. The mathematical formulation of the traditional assignment problem is, e.g., as follows:

Given two sets, Agents A and Tasks T, and a weight function E: A×T→R, find a bijection function $f: A→T$ such that the cost function $\Sigma_{a \in A} E(a, f(a))$ is minimized (or maximized).

In some embodiments, a target interception problem may include, for example, a team of autonomous mobile agents which may be required to intercept a set of static and/or dynamic targets while avoiding collisions with static and/or dynamic obstacles, e.g., which may be scattered in the environment, for example, with other autonomous mobile agents from the team. In addition, locations of the agents, targets and obstacles may be given by a Probabilistic Distribution Function (PDF), for example, due to imperfect information, e.g. limited resolution of sensors, and/or noisy environment, and/or any other problem. In other scenarios, the locations may be known.

In some embodiments, the targets and the obstacles may have different geometries, for example, which may result in different PDFs for the targets and the obstacles. In other embodiments, the targets and the obstacles may have a same geometry, which may result in equal PDFs for the targets and the obstacles.

One example of a target interception problem may include a swarm of UAVs which may be required to reach and/or intercept aerial targets and/or to hover above ground targets, for example, while avoiding possible obstacles, e.g., threats. In other examples, the swarm may include land and/or waterborne vehicles.

In one example, a mission may be defensive, e.g. protecting a strategic site from intruders. In another example, a mission may be offensive, e.g., attacking a group of moving targets.

In some embodiments, the term intercept may refer to an agent getting close to a target to monitor it, prevent it from performing certain activities, to destroy it and/or to perform any other activity relating to the target.

A known approach to the target interception problem may include assigning each target to an agent of the swarm. According to this approach, a scenario including X targets and Y agents will have $X^Y$ different possible assignments of targets to agents, which is NP Hard and thus not efficient.

In some embodiments, an efficient solution to the target interception problem may not require decomposition of the problem into sub-missions and, for example, may guarantee asymptotic stability, for example, even for a very large number of agents and targets, e.g., as the complexity of the solution may be linear to a sum of a number of agents and a number of un-intercepted targets.

In some embodiments, for deterministic scenarios, the solution may be based on a Navigation Function (NF), for example, which may be extended from single-agent single-target scenarios to multi-agent multi-target scenarios. For stochastic scenarios, the solution may be based on a Probabilistic Navigation Function (PNF), e.g., which may extend the NF for uncertain location multi-agent multi-target scenarios.

Problem Formulation

According to a first definition, a swarm, e.g., robotic swarm, mission may be defined, e.g., as follows:

The mission is cooperative, that is, it may not be completed by a single agent.

The communication between agents may be limited.

Each agent may separately perform its own decisions based on gathered information, for example, which may be limited and/or noisy.

In some embodiments, an assumption that a mission cannot be completed by a single agent may refer to time considerations, limited qualifications, or any other consideration.

In some embodiments, an operational area (also referred to as a "bounded work space") may be marked by $W \subset \mathbb{R}^N$ in which a set of agents A may intercept a set of targets T while avoiding a set of obstacles O. More precisely, the agent number $i \in A$, which may be located at $x_i^{(a)} \in W$, may be required to avoid all other agents as well as a set of obstacles, which together may constitute a set of entities. $O_i$. $x_m^{(t)} \in W$ may denote the location of the $m \in T$ target, and $x_j^{(o)} \in W$ may denote the $j \in O$ obstacle. The free portion of work space $W_i$ for the i-th agent may be defined as the subset of W which is the interior of the space which is free from the set of entities.

In some embodiments, the entities may be assumed to be disk shaped for illustrative purposes, but may have any other shape and/or geometry. For scenarios with other shapes and/or geometries, an entities' bounded radii map may be used and/or an isomorphism map may be applied.

In some embodiments, the target interception problem may issue both a deterministic scenario and a stochastic, e.g., a more realistic, scenario wherein locations are known only up to a certain extent. In both cases geometries may be assumed to be known, e.g., perfectly.

In some embodiments, a deterministic scenario may be defined as a scenario where all the entities' locations may be assumed to be known. The deterministic scenario problem may be stated e.g., as follows:

Given an environment with a set of known locations for agents, obstacles and targets, and a mission to intercept all targets by the agents while avoiding collisions, generate a path for each agent, such that at every time step the agents decrease their distance to a non-intercepted target, such that after sufficient time, all targets are intercepted by one of the agents, while collisions with other entities are avoided.

In a stochastic scenario, all entities' locations may refer to expected positions of centers of the entities, and are considered to be random variables. A set of independent Probability Density Functions (PDFs) may be available for all entities, and may be denoted as $p(x)$ for the PDF of $x \in W$. The stochastic scenario problem may be stated, e.g., as follows:

Given an environment with a set of PDFs that characterize the uncertainties of the agents', obstacles', and the targets' locations, generate a path for each agent, that maintains the probability for collision with every other entity below a given allowable probability $\Delta$, and increases the probability for intercepting a non-intercepted target, such that after sufficient time, all targets are intercepted by one of the agents.

It may be assumed that:

All random variables are normally distributed with scalar matrix covariance.

All agents are aware of the locations' PDFs of the other agents, obstacles, and the targets.

The entities keep a minimal distance from each other, for example, for all points $x \in W$ there is no pair of entities $j_1, j_2$, where the probabilities $p_{j1}(x)$ and $p_{j2}(x)$ are greater than $\Delta$.

Swarm Interception Mission with Location Certainty

In some embodiments, a navigation function for multi agents and multi targets may be introduced, e.g., for a deterministic scenario including known locations with respect to the targets and/or obstacles, e.g., as discussed below.

In some embodiments, a navigation function may be considered NF if it satisfies the following conditions: (a) it is polar; (b) it is admissible; (c) it is a Morse function; and (d) it is smooth. These conditions may guarantee convergence from any initial condition. An NF, e.g., configured for motion planning of a single agent and/or a single target, may be defined, e.g., as follows:

$$\varphi = \left(\frac{\gamma_d^K}{\gamma_d^K + \beta}\right)^{1/K} \quad (1)$$

wherein $\gamma_d = \|x-x_t\|_2^2$ is a distance-to-target function, and $x_t$ denotes a target location vector.

In some embodiments, a constant K may guarantee the convergence by setting a balance, e.g., of weights, between an urgency of reaching the targets and a distance from the entities' boundaries, e.g., as discussed below.

The obstacles function may be defined, e.g., as follows:

$$\beta = (\rho_0^2 - \|x\|_2^2)\Pi_{j \in O_j}\|x-x_j^{(o)}\|_2^2 - \rho_j^2 \quad (2)$$

wherein $\rho_j$ denoted the radius for the j-th entity, and $x_j^{(o)}$ denoted the location vector for the j-th entity. The environment may be defined as a zero entity with a radius $\rho_0$ located at an origin point.

In some embodiments, a navigation function may be considered NF if it is a Morse type, e.g., if it does not degenerated at any point in $W_{free}$, and, for example, if its Hessian values are regular at all critical points.

In some embodiments, as shown in Equation 1, the NF nominator is $\gamma_d^K$ where a value of K is equal to at least the number of obstacles. According to this example, the NF may degenerate at a target point, for example, when $y=x^4$. This problem may be approached by applying a composition of Equation 1 with a function $x \to x^{1/K}$, e.g., which may effectively eliminate the power K of the nominator.

In some embodiments, the present algorithm may include, for example, an extension and/or enhancement of the NF in a case of multiple targets and/or multiple agents, e.g., as discussed below.

In some embodiments, the deterministic scheme may solve the degenerating problem in an efficient way, for example, which may be different from an NF solution. The deterministic scheme may have a similar structure as the NF. However, the 1/K power may be eliminated and the targets function may be defined, e.g., as follows:

$$\gamma = \Pi_{m \in T}\gamma_m^{K_m} = \Pi_{m \in T}\|x-x_m^{(t)}\|_2^{2K_m} \quad (3)$$

wherein $x_m^{(t)}$ denotes a location vector of a m-th target, and $K_m$ denotes a constant related to the m-th target. $\gamma$ may be computed once, e.g., for all agents.

In some embodiments, the deterministic scheme for the i-th agent (denoted $\varphi_i$) may be defined, e.g., as follows:

$$\varphi_i = \frac{\gamma}{\gamma + \beta_i} \quad (4)$$

wherein $\beta_i$ corresponds to the i-th agent.

In some embodiments, to reduce computation complexity, $\beta_i$ may be computed as the $\beta$ for all entities divided by $\|x-x_i^{(a)}\|_2^2 - \rho_i^2$.

Convergence of the Deterministic Scheme

In some embodiments, according to the deterministic scheme, all target points of $\varphi_i$ may be non-degenerate, e.g., local, minimum points, and all minimum points may include target points, for example, only. Accordingly, a gradient descent scheme over $\varphi_i$ may converge into local minimum points, e.g., including target points only, unless an initial position of an agent is exactly on a ridge that points towards a saddle point. However, since a randomly chosen initial position has zero probability to be exactly on a ridge that points towards a saddle point, it has zero probability to converge into the saddle point, for example, and therefore the gradient descent scheme must converge into local minimum points, e.g., including target points only.

Swarm Interception Mission with Location Uncertainty

In some embodiments, a probability navigation function (PNF) for multi agents and multi targets may be introduced, e.g., for a stochastic scenario including location uncertainties with respect to at least some of the targets and/or obstacles, e.g., as discussed below.

A stochastic scheme may, e.g., similarly to the deterministic scheme, almost surely guarantee convergence, for example, since a difference, e.g., an only difference, between a stochastic formalism and a deterministic formalism is the obstacles' function β.

In some embodiments, in the stochastic scheme, β may be a function of a probability for collision with obstacles, rather than another function, e.g., a geometric function. The probability for collision may be defined, e.g., as follows:

$$\beta(x) = \Pi_{j \in O}(\Delta - p_j(x)) \quad (5)$$

wherein $p_j(x)$ is the probability for collision with the j-th entity at position x, and $\Delta$ is a predefined bound on the probability for collision.

In some embodiments, a third theorem may be defined, e.g., as follows:

Let $\gamma_m$ be the m-th target term $\|x-x_m^{(t)}\|^2$, and define $\gamma = \Pi_{m \in T}\gamma_i^{K_m}$ and $\beta = \Pi_{j \in O}(\Delta - p_j(x))$. Following the gradient descent of the function $\varphi$:

$$= \frac{\gamma}{\gamma + \beta'}$$

may almost surely converges to a target.

In some embodiments, a proof for the third theorem corresponds to a PNF proof, while a difference, e.g., an only difference, is a need to show that for a single agent the PNF almost surely converges to one of the targets and maintains the probability for collision with every other entity below the given allowable probability for collision, e.g., a probability Δ. An overview of the proof may be introduced, e.g., as discussed below.

Probability for Collision

In some embodiments, according to the stochastic scenario, locations of all targets, agents and obstacles may be random variables. Accordingly, the available knowledge about their location may be statistical. A probability for an agent and/or target and/or obstacle to be at a specified location x may be determined, e.g., as discussed below.

In some embodiments, an initially assumption may include dimensionless entities, and the dimensions may be added later on. By assuming a deterministic reference point fixed to the specified agent's estimated location, the uncertainty of the agent's location may become a deterministic value.

In one example, a given agent may be located at $x_a$ and a player, e.g., a target, an obstacle or another agent, may be located at $x_p$. Accordingly, an uncertainty in a reference location may cause PDFs of the players' location to become more uncertain, which may result, e.g., as follows:

$$f(x) = p_a(x - \hat{x}_a) * p_m(x) \tag{6}$$

wherein $p_a$ and $p_m$ may be PDFs of the agent and the player, respectively, $\hat{x}_a$ may be the agent's estimated location, and the symbol * may denote a convolution operator.

In some embodiments, a player's geometry, e.g., which may be defined as a geometry function of a disk-shaped player centered at $x_p$ with a radius r, may be added, e.g., as follows:

$$D(x, x_p, r) \triangleq \begin{cases} 1; & \|x - x_p\| \leq r \\ 0; & \text{otherwise} \end{cases} \tag{7}$$

In some embodiments, it may be efficient to relate to an agent as a dimensionless point. It may be efficient to relate to obstacles, e.g., including other agents and obstacles, as a Minkowski sum of their geometry functions and that of the agent. For example, it may be efficient to relate to a disk-shaped entity as a disk with a radius equal to a summation of relevant radii.

In some embodiments, a point x may be fixed to a body of an entity, e.g. to a center of mass of the body, and a location of an arbitrary cell point of the entity may be marked relatively to this point by a vector v. This location may be defined as a constant random variable by a probability function, e.g., as follows:

$$p_v(x|x_p) = \delta(x - (x_p + v)) \tag{8}$$

In some embodiments, since the entity's location may be measured in a global coordinate system, and v may be measured in a relative coordinate system, they may be independent of each other. A convolution of the entity's location with the location of the arbitrary cell point of the entity may yield a PDF for finding $v \in D(x, x_p, r)$ in x in the global system, which may be, e.g., as follows:

$$p_v(x) = p_v(x|x_p) * f(x) \tag{9}$$

Accordingly, the PDF for finding $v \in D(x, x_p, r)$ in x in the global system may be, e.g., as follows:

$$p_v(x) = f(x - (\hat{x}_p + v)) \tag{10}$$

In some embodiments, integrating the above for all vs, may yield a probability for collision and/or interception of the agent with the player located at x, e.g., as follows:

$$p(x) = \int_{\mathbb{R}^N} D(v, x_p, r) f(x - v) dv \tag{11}$$

Accordingly:

$$P(x) = D(x, x_p, r) * f(x) \tag{12}$$

In some embodiments, disc-shaped entities and/or normal distributions may be used, for example, for simplicity. However, geometric shapes and probabilistic distributions may be easily generalized, e.g., by bounding them by a larger circle.

In some embodiments, for an evolution of the PNF, after convolution of the agent's and the other entity's location distributions is completed, a current agent's location may be determined as a Gaussian with $\hat{x}_a$ mean and zero covariance. Equation 6 may be a distribution of a player's location, which is a Gaussian with $\hat{x}_p$ mean and/or a covariance matrix $\Sigma_a + \Sigma_p$ which is a sum of the agent's and player's covariance matrices.

In some embodiments, in order to limit a maximal collision probability to a predefined value, an inflated obstacle's boundary $\Psi$ may be defined as $P(x) = \Delta$ for every $x \in \Psi$. In a simple case where the agents and the obstacles are all disc shaped, $\Psi$ is a circle of radius $R_\Delta$.

Convolution of a Geometry with a PDF

In some embodiments, a convolution of a disc and a circular Gaussian, i.e. a covariance may be an identity matrix multiplied by a variance $I\sigma$, which may both be located at an origin, may include, e.g., the following:

$$C(x) = e^{\frac{-\|x\|^2}{2\sigma}} \sum_{s=0}^{\infty} \left(\frac{\|x\|^2}{2\sigma}\right)^s \frac{1}{s!} P\left(s + \frac{n}{2}, \frac{r^2}{2\sigma}\right) \tag{13}$$

wherein P(a, b) may be a Normalized Incomplete Lower Gamma Function, e.g., as follows:

$$P(a, b) = \frac{1}{\Gamma(a)} \int_0^b e^{-x} x^{a-1} dx \tag{14}$$

wherein $\Gamma(a)$ is a gamma function.

In some embodiments, an assumption of a circular covariance may be implemented, e.g., for a general case, when taking a as an upper bound of a distribution. For example, $\sigma$ may be a maximal eigenvalue of a covariance matrix.

In some embodiments, a gradient of Equation 13 may be calculated, e.g., as follows:

$$\nabla C(x) = \tag{15}$$

$$\frac{\partial P(x) \partial \|x\|_2^2}{\partial \|x\|_2^2 \partial x} = 2x e^{\frac{-\|x\|^2}{2\sigma}} \left( \sum_{s=1}^{\infty} \left(\frac{\|x\|^{2(s-1)}}{(2\sigma)^s (s-1)!}\right)^s P\left(s + \frac{n}{2}, \frac{r^2}{2\sigma}\right) - \sum_{s=1}^{\infty} (2\sigma)^{-s-1} \frac{\|x\|^{2s}}{s!} P\left(s + \frac{n}{2}, \frac{r^2}{2\sigma}\right) \right)$$

In some embodiments, it may be known that $$P(a+1, x) - P(a, x) = -\frac{x^a e^{-x}}{\Gamma(a+1)}.$$

Accordingly, a modified Bessel function may be formulated, e.g., as follows:

$$I_a(x) = \sum_{s=0}^{\infty} \frac{1}{s! \Gamma(s+a+1)} \left(\frac{x}{2}\right)^{2s+a} \tag{16}$$

Accordingly:

$$\nabla C(x) = \frac{-2xr^n e^{-\left(\frac{r^2 + \|x\|^2}{2\sigma}\right)}}{(2\sigma)^{\frac{n}{2}+1}} I_0\left(\frac{\|x\|r}{\sigma}\right) \tag{17}$$

In some embodiments, a probability for collision and/or intersection with an m-th entity may be, e.g., as follows:

$$P_m(x) = C(x - x_m^{(p)}) \tag{18}$$

Complexity Analysis

In some embodiments, one of the main challenges in multi-agent multi-target missions may be reducing computation complexity. A complexity of the Swarm interception algorithm, e.g., the stochastic and/or deterministic schemes, may be optimal, e.g., as discussed below.

In some embodiments, Equations 2, 3 and 4 may involve computations of m distances from the targets, and n distances from the obstacles. Thus, the total complexity of the Swarm interception algorithm is $O(N^2 (m+n)+(m+n)^2$. This may suffice for solving the problem of an entire swarm of agents. This estimation should not be multiplied by n since Equations 2 and 3 are computed once, e.g., only, for example, since $$\beta_i = \frac{\beta}{\|x - x_i^{(a)}\|_2^2 - \rho_i^2}.$$

A simple calculation may leads to a conclusion that the Swarm interception algorithm may be preferable, for example, at least as long as $m < n^\alpha$ with $\alpha = 1 + \log(n-1)/\log(n)$, which equates for situations where the number of targets is about the square of the number of agents.

Experimental Results

In some embodiments, a set of experiments was implemented to test the stochastic and/or deterministic schemes in the following scenarios:

(Static scenarios with five, e.g., idle, obstacles and 10 targets which may be fixed to initial random locations.
As in (1) wherein the obstacles are moving in random directions and/or bouncing back if they reach $W_{free}$'s boundary.
As in (2) wherein the targets are free to move in random directions and/or bounce back if they reach $W_{free}$'s boundary.

In some embodiments, experiments were conducted for all scenarios with the number of agents varying from 1 to 10. The experiments were repeated for deterministic cases, e.g., the deterministic scheme, and for uncertain and/or stochastic cases, e.g., the stochastic scheme.

In some embodiments, the simulation properties were configured, e.g., as follows: the world was set to be a sphere world, i.e. all players and a boundary of the playground were circular. The obstacles' and agents' radii were set to be 2 length-units, and the playground radius was set to be 45 length units. All constant $K_i$s were set to be equal to the total number of agents and obstacles. For uncertain scenarios $\Delta=0.9$ was chosen, and the STD for an estimation error was simulated as 1 length-unit. The maximal agent velocity in both the deterministic and the stochastic cases was set to be 1 length-unit/time-unit. For dynamic obstacles and targets scenarios, maximal velocities were chosen to be standard normal random variables with a mean of 0:5 length-units/time-unit.

Figure 3:
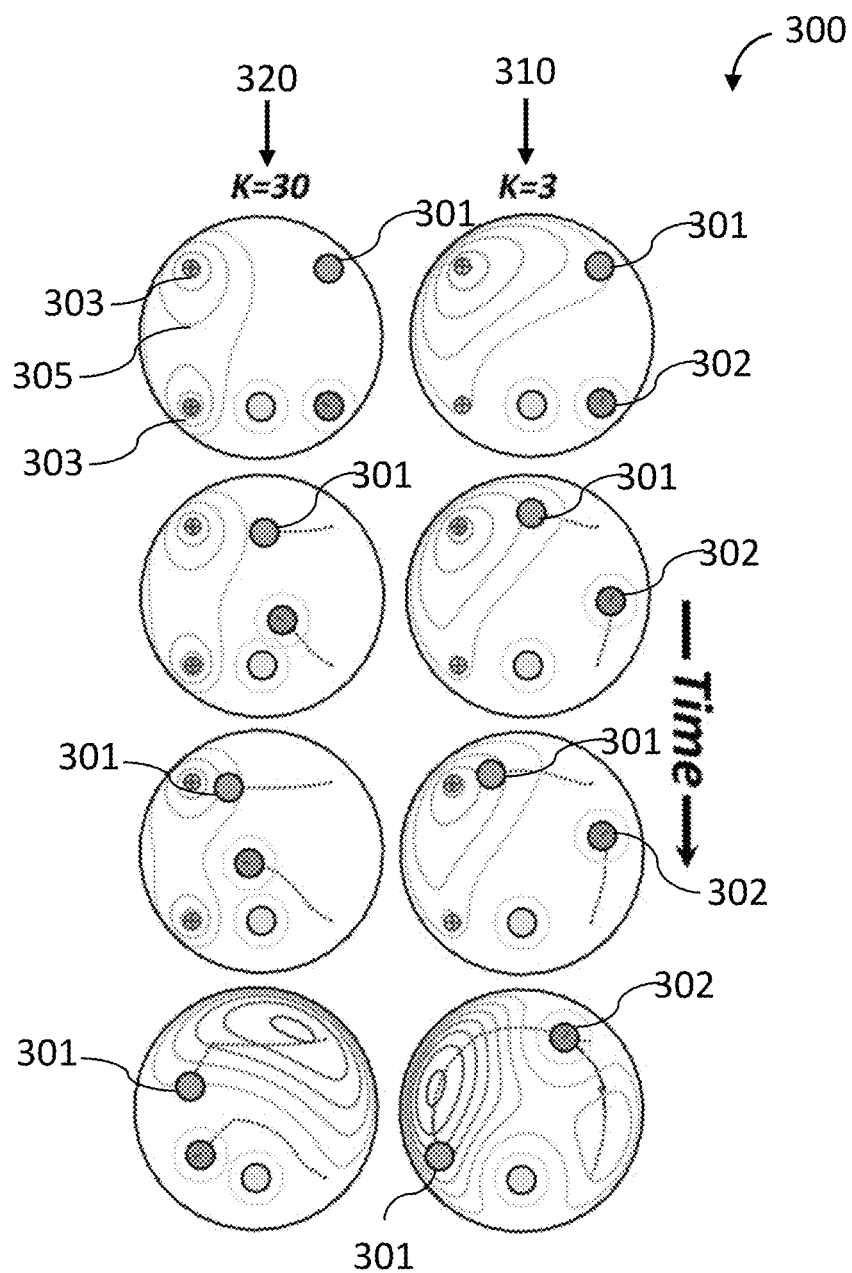
FIG. 3 shows a schematic illustration of a multiple target interception scenario according to the present algorithm, according to an embodiment.

Reference is now made to FIG. 3, which is a schematic illustration of a combined task allocation and trajectory planning scenario according to a Swarm-NF scheme. Snapshots 300 may include snapshots 310 representing a scenario where a value of a constant K is equal to 3, and snapshots 320 representing a scenario where a value of the constant K is equal to 30.

As shown in FIG. 3, the scenario may include two agents 301 and 302, and two targets 303. Contour lines 305 may represent the Swarm-NF values computed for agent 301.

In some embodiments, when the value of the constant K is equal to 3, e.g., in snapshots 310, a performance of the Swarm-NF scheme may be sub-optimal, for example, since agent 302 moves away from targets 303 to avoid possible collision with an obstacle.

In some embodiments, when the value of the constant K is equal to 30, e.g., in snapshots 320, a performance of the Swarm-NF scheme may be close to the optimal, for example, since agent 301 moves almost along a straight line towards target 303 while agent 302 moves towards a bottom left target 303 while maintaining a safety distance from the obstacle. When the value of the constant K is 30, the Swarm-NF scheme may be very close to an optimal solution, e.g., which may be NP hard.

Figure 4:
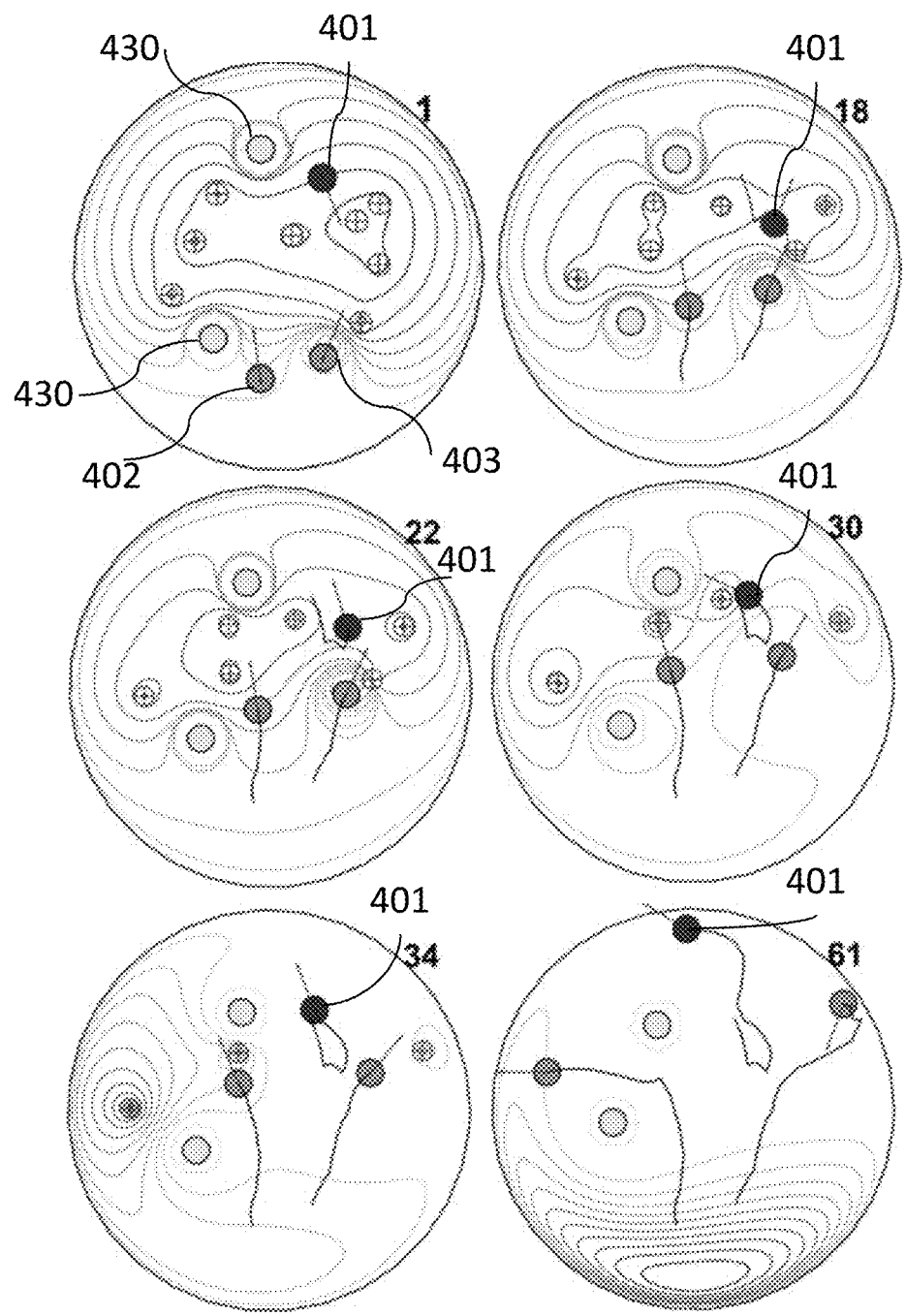
FIG. 4 shows a schematic illustration of a deterministic multiple target interception scenario according to the present algorithm, according to an embodiment.

Reference is now made to FIG. 4, which is a schematic illustration of a deterministic scenario according to the deterministic scheme. The deterministic scenario may include three agents 401, 402, and 403, which may intercept eight dynamic targets while avoiding collisions with two dynamic obstacles 430. The agents' orientation may be marked by a straight black line, e.g., line 409, and/or contour lines 405 may represent NF values computed for agent 401.

As shown in FIG. 4, until time stamp 34, a number of targets is larger than a number of agents, and each agent may be directed towards a different target. When a number of un-intercepted targets is less than 3, e.g., as in timestamps 34 and 61, agent 401 may be directed on a course that maximizes a distance to agents 402 and 403, and leaves them to intercept the last two targets by themselves. At time stamp 61, when all targets are intercepted and the mission is completed, all agents may turn to opposite directions, for example, in order to maximize a distance from each other.

Figure 5:
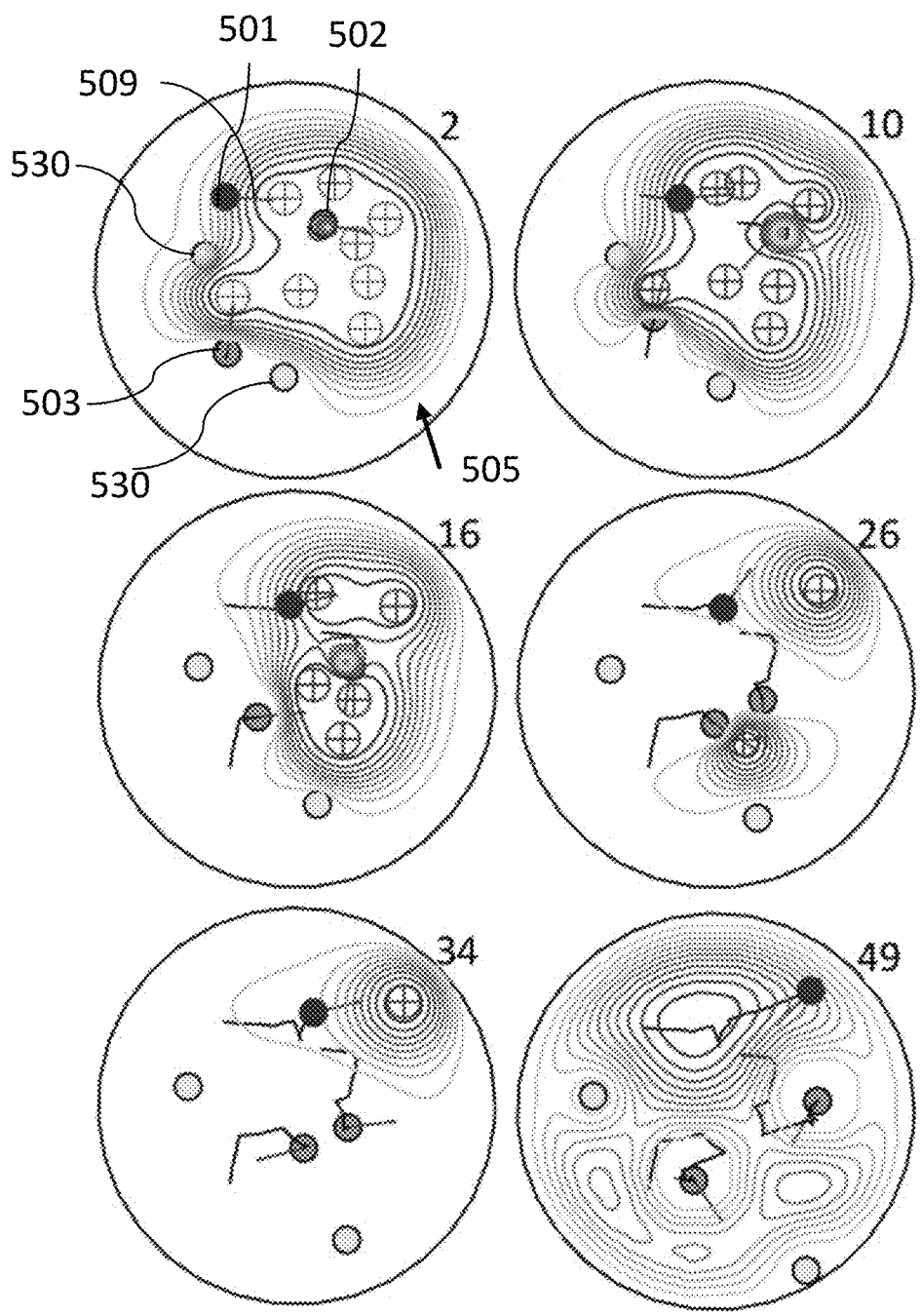
FIG. 5 shows a schematic illustration of a stochastic multiple target interception scenario according to the present algorithm, according to an embodiment.

Reference is now made to FIG. 5, which is a schematic illustration of a stochastic scenario according to a stochastic scheme. The stochastic scenario may include three agents 501, 502, and 503, which may intercept eight dynamic targets while avoiding collisions with 2 dynamic obstacles 530. The agents' orientation may be marked by a straight black line, e.g., line 509, and contour lines 505 may represent NF values computed for agent 501.

As shown in FIG. 5, at time stamps 2, 10, and 16, every agent is directed to a different target. When a number of targets is smaller than a number of agents, for example, from time stamp 26 onwards, multiple agents may be directed towards a same target while avoiding mutual collisions. After intercepting a target, e.g., at time stamp 34, agents may turn to opposite directions to recede from each other. At time stamp 49, when all targets are intercepted, agents may maintain a safe distance from each other and from an environment boundary.

As shown in FIG. 5, trails of the agents' movement may be rugged compared with the deterministic scenario, for example, since PNF uses estimated locations, e.g., which may be noisier than using geographical locations. An estimation error STD may be one third of a robot's radius.

Figure 6:
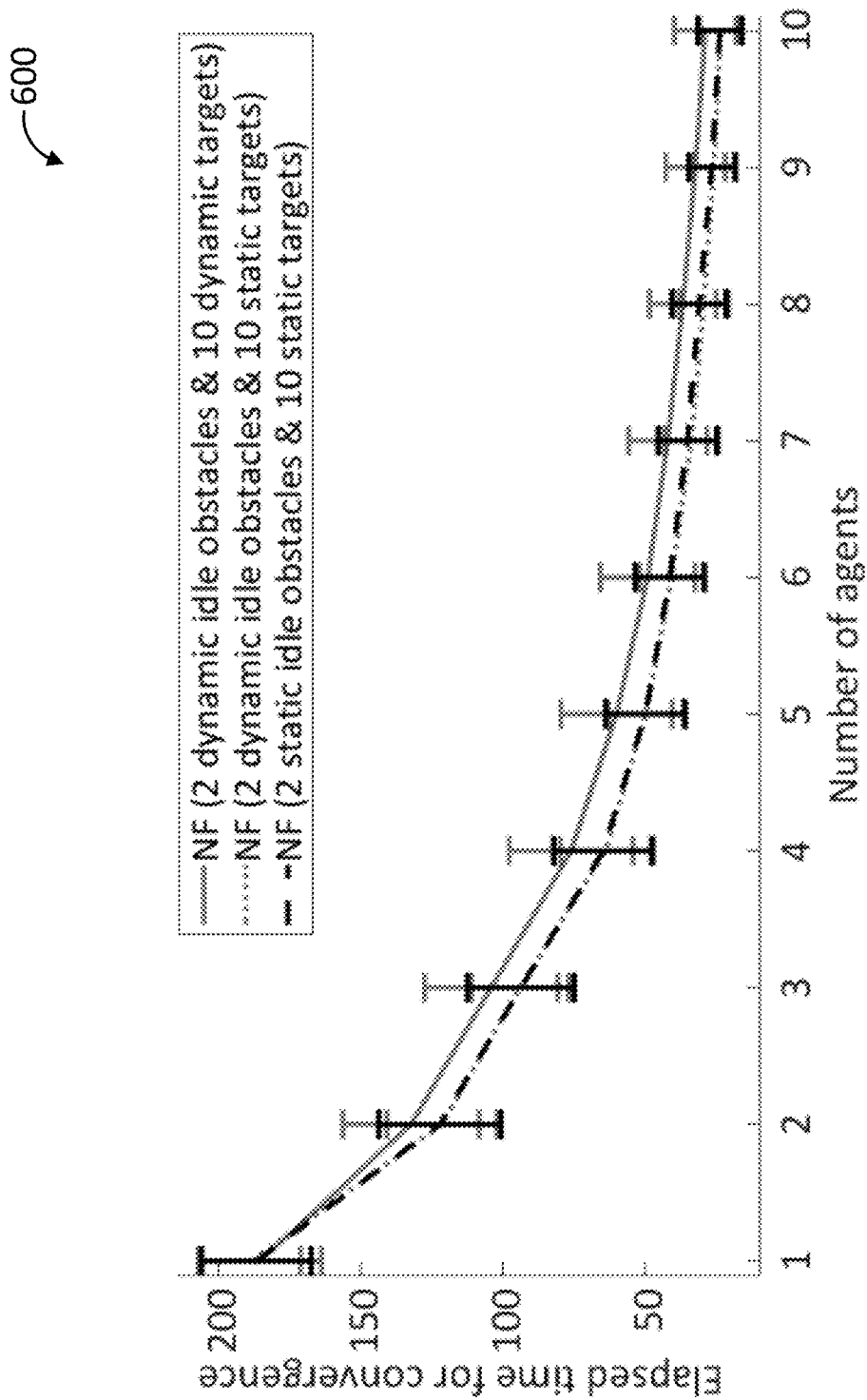
FIGS. 6-7 illustrate experimental results, according to an embodiment.

Reference is now made to FIG. 6, which is a graph 600 which may represent performances of the deterministic scheme for various scenarios with dynamic and/or static obstacles and targets. Graph 600 may show an average elapsed time for convergence of 100 Monte-Carlo runs.

Figure 7:
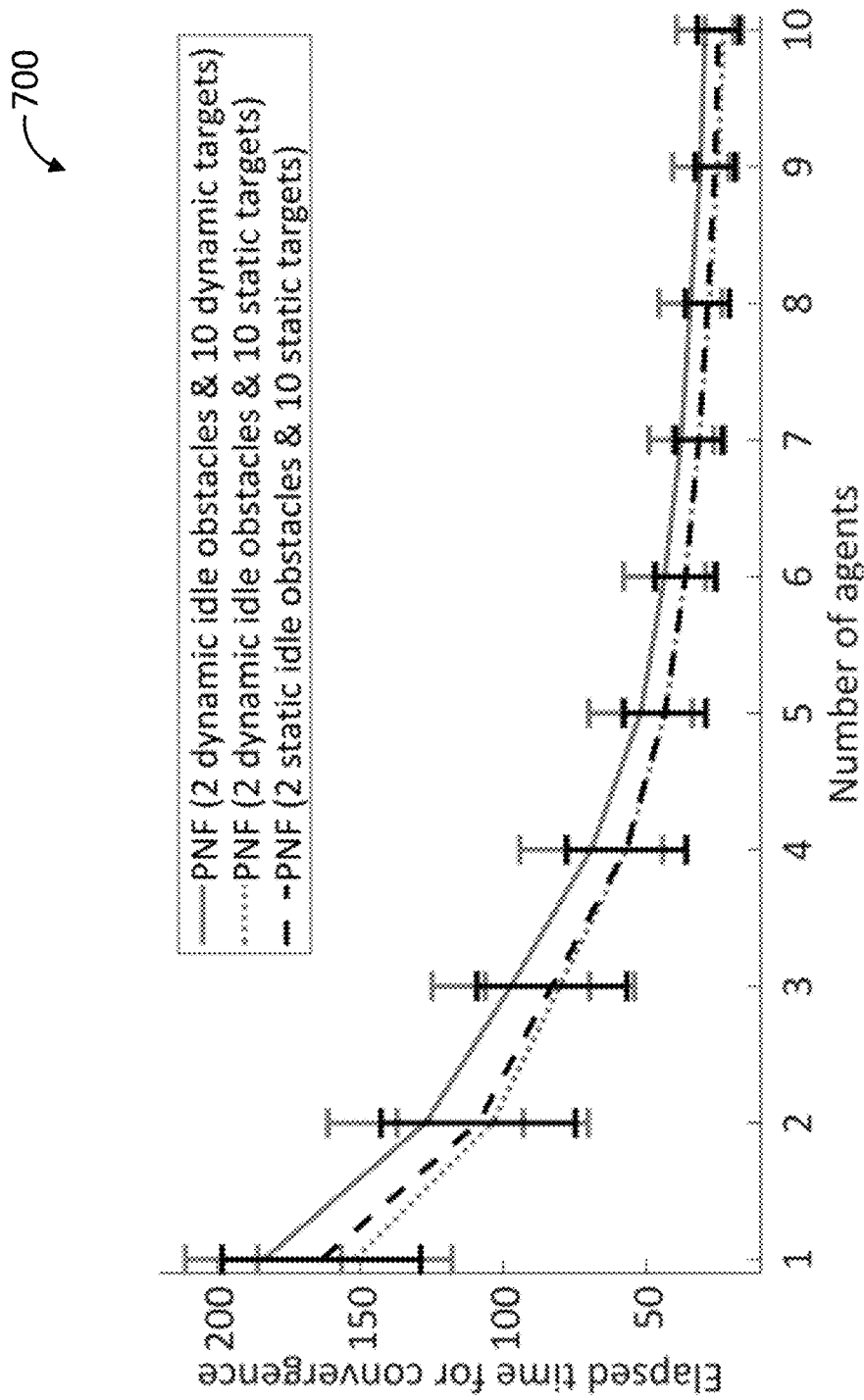

Reference is now made to FIG. 7, which is a graph 700 which may represent performances of the stochastic scheme for various scenarios with dynamic and/or static obstacles and targets. Graph 700 may show an average elapsed time for convergence of 100 Monte-Carlo runs.

As shown in FIGS. 6 and 7, there are similarities between an expected time for convergence in the deterministic and stochastic cases, as well as between scenarios that involve static and dynamic targets. These similarities show a robustness to uncertainties of the stochastic scheme, and its ability to cope with dynamic targets with a minor addition to an expected time for convergence, e.g., less than 30% extra time compared with a case of static targets. For all experiments, a clock stops when all targets are intercepted.

Figure 8:
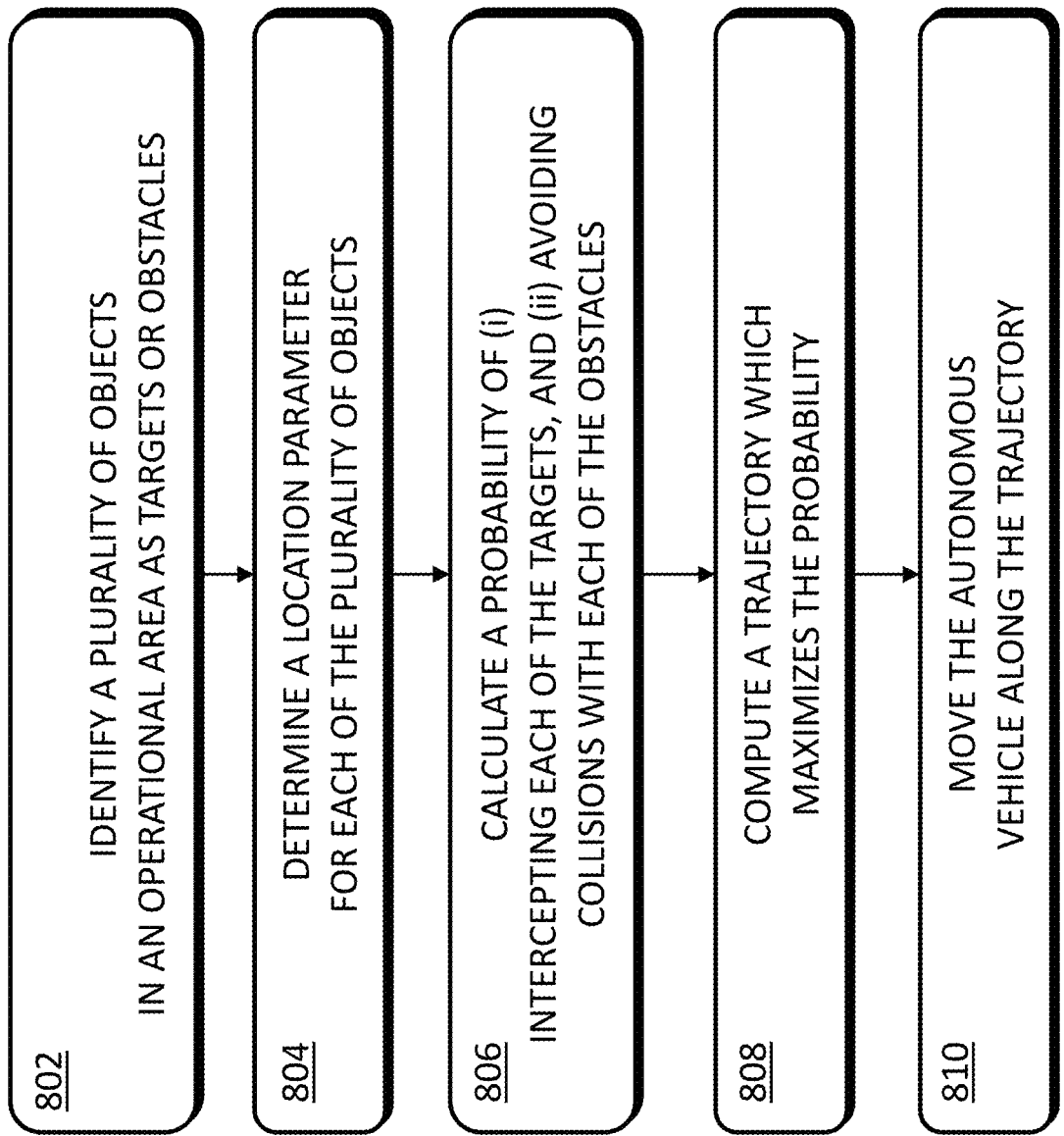
FIG. 8 is a flowchart of a method for multiple target interception, according to an embodiment.

Reference is now made to FIG. 8, which is a flowchart illustrating an exemplary method of target interception according to certain embodiments of the present disclosure. The steps of the method are described herein with reference to the medical diagnostic procedure of colposcopy.

At step 802, the method may include identifying, at an autonomous vehicle, a plurality of objects in an operational area as targets or obstacles. For example, autonomous vehicle 200 (FIG. 2) may identify a plurality of objects in operational area 130 (FIG. 1) as targets 135 (FIG. 1) or obstacles 133 (FIG. 1).

At step 804, the method may include determining a location parameter for each of the plurality of objects. For example, autonomous vehicle 200 (FIG. 2) may determine a location parameter for each of the plurality of objects.

At step 806, the method may include calculating, based at least in part on location parameters of each of the plurality of objects, a probability of intercepting each of the targets, and avoiding collisions with each of the obstacles. For example, autonomous vehicle 200 (FIG. 2) may calculate, based at least in part on location parameters of each of the plurality of objects, a probability of intercepting each of the targets 135 (FIG. 1), and avoiding collisions with each of the obstacles 133 (FIG. 1).

At step 808, the method may include computing a trajectory which maximizes the probability. For example, autonomous vehicle 200 (FIG. 2) may compute a trajectory which maximizes the probability.

At step 810, the method may include moving the autonomous vehicle along the trajectory. For example, autonomous vehicle 200 (FIG. 2) may move the autonomous vehicle along the trajectory.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of modified purpose computer, special purpose computer, a general computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
 operating a swarm of autonomous vehicles to maximize a number of intercepted targets, wherein, for each of said autonomous vehicles, the method comprises:
 identifying a plurality of objects in an operational area as targets or obstacles;
 for each of said plurality of objects, determining a probability density function (PDF) location parameter, representing probability density of location, and geometry;
 calculating a trajectory of motion for said autonomous vehicle based on said location parameters of each of said plurality of objects, wherein said calculating: (i) maximizes a probability of intercepting each of said targets by said autonomous vehicle, and (ii) applies a predefined bound on a probability of avoiding collisions with each of said obstacles; and
 moving said autonomous vehicle along said trajectory of motion,
 wherein said calculating is performed by each of said autonomous vehicles separately of all other said autonomous vehicles in said swarm of autonomous vehicles.

2. The method of claim 1, wherein said identifying comprises determining a distance between said autonomous vehicle and at least some of said plurality of objects.

3. The method of claim 2, wherein said calculating is based, at least in part, on said determined distances.

4. The method of claim 1, wherein said operating comprises repeating iteratively said identifying, determining, calculating, and moving, until all said targets are intercepted.

5. The method of claim 1, wherein said location parameter of an object comprises a geographical location of said object.

6. The method of claim 1, wherein at least some of said identifying and said determining comprises receiving information from an external source selected from a group consisting of: a sensing unit of said autonomous vehicle, another autonomous vehicle, and a control center.

7. The method of claim 1, wherein said calculating comprises weighting said probability of intercepting and said probability of avoiding collisions based, at least in part, on a count of said plurality of objects.

8. The method of claim 1, wherein the obstacles comprise at least one other autonomous vehicle of the swarm of autonomous vehicles.

9. The method of claim 1, wherein, with respect to a target, said intercepting comprises at least one of: achieving physical proximity to the target, destroying the target, monitoring the target, and changing the target.

10. A swarm of autonomous vehicles, each comprising at least one hardware processor, and a non-transitory computer-readable storage medium having stored thereon program instructions, the program instructions executable by the at least one hardware processor to operate said autonomous vehicle to:
 identify a plurality of objects in an operational area as targets or obstacles;
 determine a probability density function (PDF) location parameter, representing probability density of location and geometry for each of said plurality of objects;
 calculate a trajectory of motion for said autonomous vehicle, based, at least in part, on said location parameters of each of said plurality of objects, wherein said calculating: (i) maximizes a probability of intercepting each of said targets by said autonomous vehicle, and (ii) applies a predefined bound on a probability of avoiding collisions with each of said obstacles; and
 move said autonomous vehicle along said trajectory of motion,
 wherein said calculating is performed by each of said autonomous vehicles separately of all other said autonomous vehicles in said swarm of autonomous vehicles.

11. The swarm of claim 10, wherein said identifying comprises determining a distance between said autonomous vehicle and at least some of said plurality of objects.

12. The swarm of claim 11, wherein said calculating is based, at least in part, on said determined distances.

13. The swarm of claim 10, wherein said operating comprises repeating iteratively said identifying, determining, calculating, and moving, until all said targets are intercepted.

14. The swarm of claim 10, wherein said location parameter of an object comprises a geographical location of said object.

15. The swarm of claim 10, wherein at least some of said identifying and said determining comprises receiving information from an external source selected from the group consisting of: a sensing unit of said autonomous vehicle, another autonomous vehicle, and a control center.

16. The swarm of claim 10, wherein said calculating comprises weighting said probability of intercepting and said probability of avoiding collisions based, at least in part, on a count of said plurality of objects.

17. The swarm of claim 10, wherein the obstacles comprise at least one other autonomous vehicle of the swarm of autonomous vehicles.

18. The swarm of claim 10, wherein, with respect to a target, said intercepting comprises at least one of: achieving physical proximity to the target, destroying the target, monitoring the target, and changing the target.

* * * * *